Patented Nov. 26, 1940

2,222,949

UNITED STATES PATENT OFFICE 2,222,949

NONAQUEOUS DRILLING FLUID

Rudolf August Henkes, Maracaibo, Venezuela, assignor to Shell Development Company, San Francisco, Calif., a corporation of Delaware No Drawing. Application February 26, 1940, Serial No. 320,887. In the Netherlands April 6, 1939

4 Claims. (Cl. 255—1)

This invention relates to improvements in nonaqueous drilling fluids for use in drilling wells. More particularly it relates to the use of stabilizing agents in oil base drilling fluids containing weighting materials which have a tendency to settle out.

In the art of drilling wells for oil or gas by the rotary method, ordinarily a fluid composed of a suspension of clay in water is pumped down the drill pipe through the drill bit in order to wash to the surface the particles of earth cut by the bit. During drilling, heavy shale formations are frequently encountered which swell and disintegrate on contact with water and cave into the hole. Often this movement of shale freezes or sticks the drill pipe and bit, making it difficult or impossible to remove these tools from the borehole. As it is sometimes impossible to penetrate these shale formations by ordinary methods of drilling which use water-base mudflushes and, also, since in completing wells oil layers are sometimes plugged by the penetration thereinto of water from water-base mudflushes, it has been previously proposed to use a drilling fluid composed of a suspension in a nonaqueous medium, such as mineral oil, coal and tar distillates, topped crude oil, gas oil, kerosene, etc., of weighting materials such as finely divided hematite, galenite, barytes, silica, clay, calcium carbonate, for example, ground oyster shells, etc. Ordinarily, weighting materials in nonaqueous suspensions have an excessive tendency toward sedimentation and to overcome this deficiency of nonaqueous drilling fluids, slaked lime and other alkaline substances have been proposed as stabilizing agents. However, such alkaline stabilizing agents are often unsatisfactory and fail to prevent sedimentation of weighting material in these drilling fluids, especially in fluids of relatively high or relatively low specific gravities, that is, in fluids containing relatively high or relatively low amounts of inert weighting materials.

It is therefore an object of this invention to provide an improved nonaqueous drilling fluid which is stable both at relatively high specific gravities and which comprises lampblack as a stabilizing agent or sedimentation inhibitor.

Lampblack has been found to be an especially desirable stabilizing agent for nonaqueous drilling fluids. Not only does its use develop a suitable weak gel structure which prevents sedimentation of the weighting materials, but the stabilizing action is unaffected by the necessary use of plastering agents, such as blown asphalt. Likewise, lampblack, due to its relatively large amorphous particles, does not cause permanent plugging of the porous formations; that is, good deplastering is not impaired by its use. In this regard, lampblack is definitely superior to other stabilizing agents such as, for example, carbon black, which, due to the small size and crystalline nature of its particles, permanently plugs porous formations and therefore often cannot be advantageously used. Lampblack also possesses certain oiliness properties which make it readily miscible with oil, that is, very easily wetted by oil, a property not possessed by carbon black.

Due to the thixotropic properties imparted to nonaqueous drilling fluids by lampblack, it is possible to prepare, in addition to very stable drilling fluids of ordinary specific gravities, such as about 2.0, also drilling fluids which are stable and have relatively low specific gravities, such as, for example, 1.5, 1.2 or lower. Previously it had not been possible to prepare a nonaqueous drilling fluid containing a relatively small amount of weighting material without it showing an excessive tendency toward sedimentation. For example, a drilling fluid with a specific gravity of 1.20, consisting of 37.5 parts by weight of ground porcellanite, 51.1 parts by weight of a crude oil topped to 200° C., and 8.5 parts by weight blown asphalt yielded a solid sediment after standing for 24 hours. But on addition of 2.9 parts by weight lampblack to a drilling fluid of the same composition, a homogeneous suspension was maintained throughout an equal period of time.

By using lampblack, it is not only possible, according to the present invention, to prepare drilling fluids which are very stable but the amount of weighting material can also be raised to such an extent as to produce drilling fluids of high specific gravities, such as 3, 3.5, or higher, which are eminently suited for use in formations in which high pressures occur.

Another particular advantage of nonaqueous drilling fluids containing lampblack is that the stability of these drilling fluids is not affected to any appreciable extent by high temperatures such as 160–200° F. occurring within deep wells.

The beneficial effect of lampblack on the sedimentation properties of oil-base drilling fluids may be seen from the results of the tests shown in the table. In these tests samples of the composition indicated were allowed to stand in graduated cylinders. At the times shown, the amount of oil which had separated from the oil-weighting material mixture, or from which the weighting material had settled, was taken as a measure of the sedimentation and is expressed as a percentage of the total volume of mixture. Thus, a high percentage of oil containing no weighting material indicates much sedimentation and a low value, conversely, indicates little sedimentation.

Table

| Exp. No. | Composition of drilling fluids, parts by weight | | | Lampblack added in percent by weight of drilling fluid | Specific gravity | Percent settling after— | | |
|---|---|---|---|---|---|---|---|---|
| | Stove oil | (Weighting material) | | | | 1 hr. | 7 hrs. | 16½ hrs. |
| | | Ground shells | Barytes | | | | | |
| 1 | 125 | 252.5 | -------- | 0 | 1.05 | 40 | ----- | 49 |
| 2 | 125 | 252.5 | -------- | 1 | 1.05 | 18 | ----- | 46 |
| 3 | 125 | 252.5 | -------- | 3 | 1.05 | 2 | ----- | 24 |
| 4 | 125 | 252.5 | -------- | 5 | 1.05 | 0 | ----- | 7 |
| 5 | 122.5 | -------- | 84.1 | 0 | 1.24 | 65.5 | 72 | ----- |
| 6 | 122.5 | -------- | 84.1 | 1 | 1.24 | 43 | 60 | ----- |
| 7 | 122.5 | -------- | 84.1 | 3 | 1.24 | 15 | 32 | ----- |
| 8 | 122.5 | -------- | 84.1 | 5 | 1.24 | 0.5 | 5.5 | ----- |

In general, the sedimentation inhibitor, namely, lampblack, may be used in quantities from 1% to 10% and preferably from 2-6% based on the weight of the drilling fluid, although greater or lesser amounts may be used, depending on the amount, density, and kind of material suspended in the fluid and other requirements such as may be particular to each drilling fluid or application.

In preparing a stable mudflush according to the present invention, if blown asphalt is to be used in the composition, the oil is first mixed therewith according to suitable methods for making asphalt cutbacks. To this oil or oil-asphalt base the weighting material, such as oyster shells, and the lampblack are added in the order desired. That is, either the shells or the lampblack may be added first, or the two may be mixed dry and then added to the oily base. After the oily base, the weighting material and the lampblack are suitably mixed together, the resultant stable nonaqueous mudflush is ready for use in the well.

I claim as my invention:

1. A drilling fluid comprising a mineral oil, a weighting material, and lampblack as a sedimentation inhibitor.

2. A nonaqueous drilling fluid comprising mineral oil, a finely divided solid material suspended therein, and lampblack as a sedimentation inhibitor.

3. A drilling fluid comprising a mineral oil, a finely divided solid material, and 2 to 6 percent by weight of lampblack as a sedimentation inhibitor.

4. In drilling a well, the step of circulating therein a drilling fluid comprising a mineral oil, a finely divided solid material suspended therein, and lampblack as a sedimentation inhibitor.

RUDOLF AUGUST HENKES.